United States Patent [19]

Albery

[11] 4,353,165
[45] Oct. 12, 1982

[54] SAW

[76] Inventor: William Albery, 8 Delamere Rd., Gatley, Cheshire, England

[21] Appl. No.: 188,405

[22] Filed: Sep. 18, 1980

[30] Foreign Application Priority Data

Sep. 19, 1979 [GB] United Kingdom ............... 7932486
Apr. 15, 1980 [GB] United Kingdom ............... 8012338

[51] Int. Cl.³ .............................................. B27B 9/02
[52] U.S. Cl. ........................................ 30/376; 30/377
[58] Field of Search ................ 30/375, 376, 377, 371, 30/374, 388, 390

[56] References Cited

U.S. PATENT DOCUMENTS

| | | | |
|---|---|---|---|
| 1,854,510 | 4/1932 | Haas | 30/376 |
| 1,858,459 | 5/1932 | Ramey | 30/376 |
| 2,657,719 | 11/1953 | Forsberg | 30/376 |
| 3,242,953 | 3/1966 | McCarty | 30/376 X |

Primary Examiner—Jimmy C. Peters
Attorney, Agent, or Firm—Alan H. Levine

[57] ABSTRACT

A rotatable portable saw has a saw blade 2 which is pivotally mounted with respect to plate 15 so that the position of the blade relative to the plate 15 can be altered to alter the depth of cut. In a modified form the saw blade can be angled slightly to the direction of traverse of the saw so that the width of the cut can be made slightly greater than the width of the blade. In use the saw is traversed across a workpiece with the blade positioned to produce a scribing cut in the surface of the workpiece and then traversed back across the workpiece, after lowering the blade position relative to the workpiece, so that the workpiece is cut right through. In this way, for a given directional rotation of the blade, the blade can be made always to approach the surface being cut so that splintering of the workpiece is substantially reduced or eliminated. With the modified form of saw the blade is angled so that the scribing cut is made slightly wider than the saw blade and the blade is realigned at the end of the first traverse with the direction of traverse so that on the reverse traverse the saw blade emerges in the wider cut reducing still further any chance of splintering.

13 Claims, 8 Drawing Figures

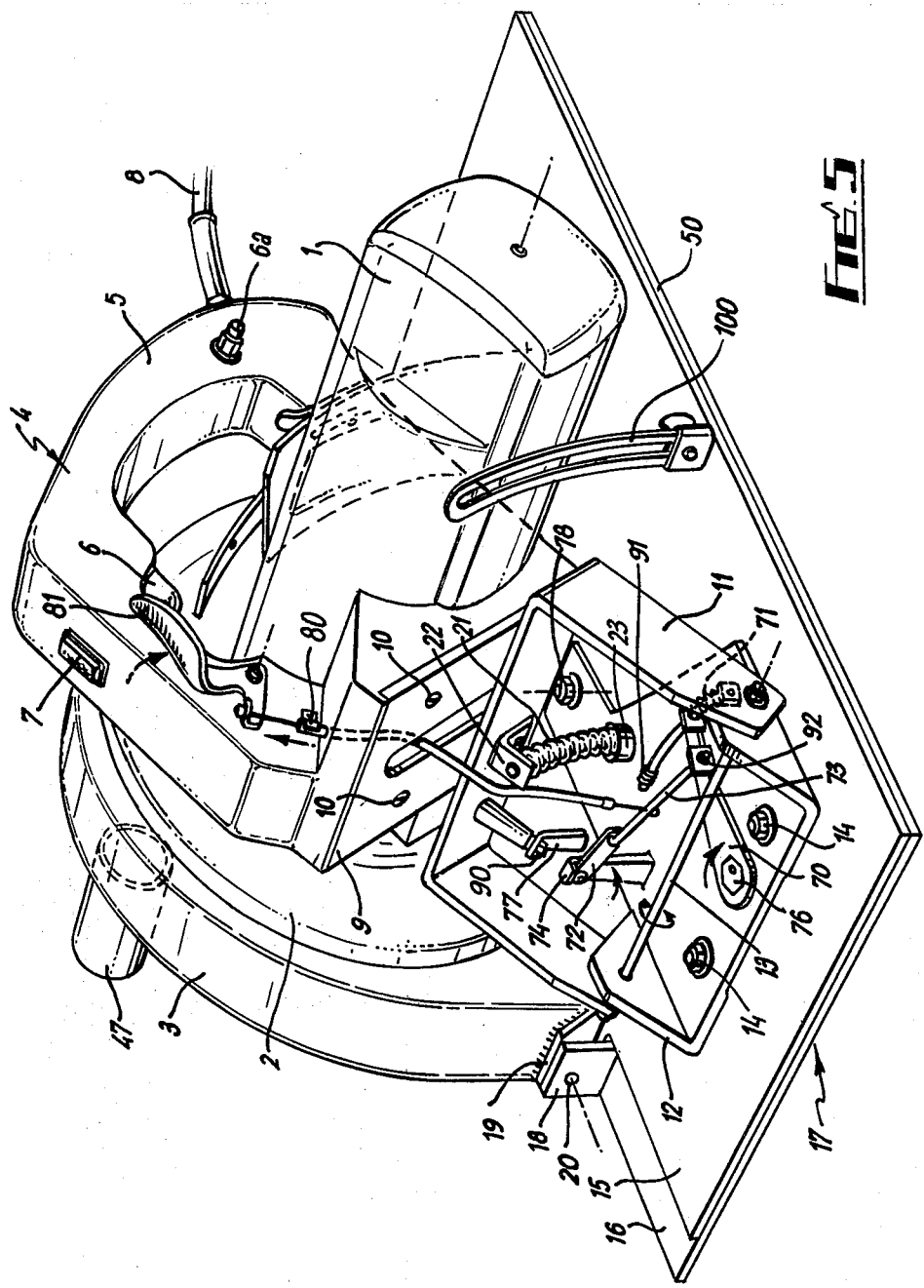

SAW

The present invention relates to a saw having a rotatable saw blade, and particularly but not exclusively, to such saws which, in operation, are moved through the workpiece to effect a cut.

With saws of this type, the saw blade at the point at which it emerges from the wooden workpiece being sawn tends to splinter the wood causing an unclean cut. This splintering occurs with even the most expensive tungsten carbide saw blades. The problem is particularly acute with coated materials such as melamine coated chipboard. This type of coating is very prone to chipping by the emerging saw blade at the saw cut and once chipped produces an unsightly appearance which cannot satisfactorily be concealed.

According to one aspect of the present invention there is provide a method of producing a saw cut through a workpiece including the steps of traversing a rotating saw blade in one direction across the workpiece, the direction of rotation of the saw blade being such that its forwrad cutting edge continually approaches the surface of the workpiece from outside the workpiece and the depth of cut being less than the thickness of the material, altering the relative position of the saw blade and workpiece so that on traversing the workpiece again the saw blade will extend completely through the material and traversing the saw blade across the workpiece in the reverse direction to the first mentioned direction but with the same direction of rotation so that the forward cutting edge of the saw blade continually approaches the opposite surface of the workpiece to the first mentioned surface from outside the workpiece.

In a modification of the above method, the saw blade is disposed at a slight angle to the direction of traverse on the first mentioned traverse, but is aligned with the direction of traverse on the second mentioned traverse.

According to another aspect of the invention, there is provided a saw comprising a planar base, a rotatable saw blade pivotally mounted with respect to the base so that the axis of rotation of the blade is parallel to the pivotal axis and so that the cutting edge of the blade may depend below the plane of the base, and latch means enabling the saw blade to be fixed in a pivoted position relative to the base.

A preferred embodiment of the saw of the invention may comprise any one or more of the following advantageous features:

(a) The latch means comprises a bracket fixed to the planar base and a latch member slidable with respect to the bracket.

(b) The latch member defines a plurality of apertures and the bracket comprises a locating complementary stop which can extend through one of the apertures in order to latch the bracket and member together in one of a plurality of relative positions.

(c) Spring means are provided to urge the bracket and latch member of (a) and (b) together.

(d) The saw comprises a handle which may be grasped by an operator to pivot the saw blade relative to the base.

(e) The latch member of (a) is pivotally mounted on the handle of (d).

(f) The bracket of (a) defines an elongate slide enabling the saw blade to be locked in any required pivotal position relative to the base in the plane of the saw blade.

(g) The saw comprises an electric motor drivably connected to the saw blade and disposed in a housing connected to the handle of (d).

(h) The handle of (d) is connected to a U-shaped bracket which is pivotally connected to a bracket on the base to provide the pivotal mounting of the saw blade with respect to the base.

(i) The bracket on the base is adjustable with respect to the planar base.

(j) The planar base is itself pivotal with respect to a further base member about an axis at right angles to the axis of rotation of the saw blade.

(k) The saw blade is enclosed in a protective housing.

(l) The pivotal mounting of the saw blade is such that the plane of the blade may be angled to the planar base.

(m) The pivotal mounting of (l) of the saw blade in the base comprises a bracket mounted for pivotal movement about a point lying on or near the centre line of the blade in a plane at right angles to the plane of the blade.

(n) A mechanism is associated with the pivotal mounting of (m) for pivoting the bracket between first and second position in dependence upon the position of the latch means.

(o) The mechanism is automatic.

(p) The mechanism comprises a spring loaded lever arrangement controlling an eccentric.

In order that the invention may be more clearly understood, two embodiments thereof will now be described, by way of example, with reference to the accompanying drawing, in which:

FIG. 5 shows a perspective view, similar to the view shown in FIG. 1, of a modification of the saw shown in FIG. 1.

Figure 1:
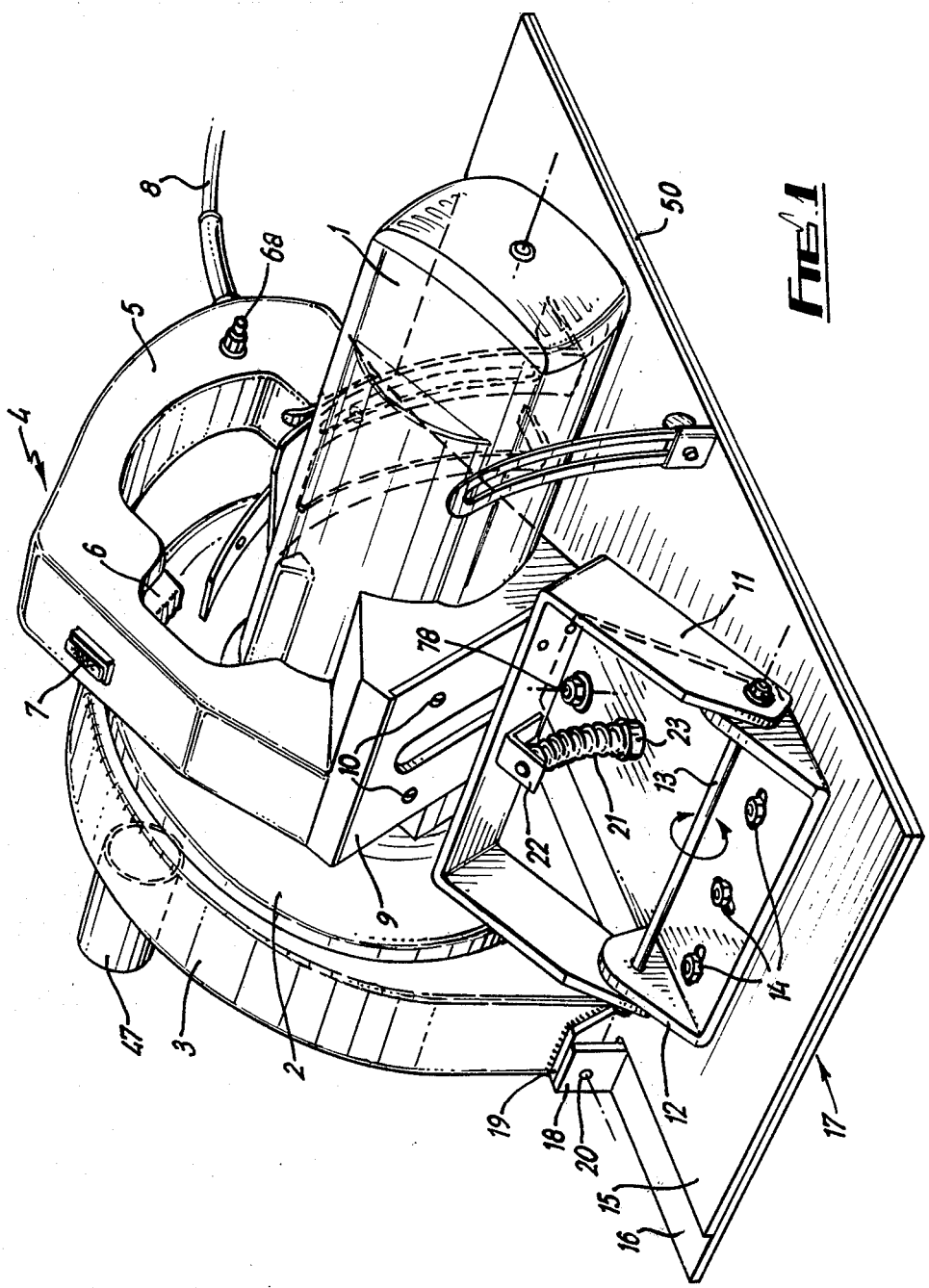
FIG. 1 shows a perspective view of a portable circular saw.

Referring to FIGS. 1 to 4 of the drawings, the saw comprises an electric driving motor housed in a housing 1 and operative to rotate a circular saw blade 2 disposed partially in a safety housing 3. The motor and motor housing 1 are disposed on opposite sides respectively of a central body 4 moulded from synthetic plastics material to form a handle 5 for the saw operator. The handle 5 incorporates a power on/off switch 6, a neon power on/off indicator 7 and a latch 6a, thus enabling switch 6 to be temporarily held in the on position. The electrical power lead to the saw is shown at 8.

The central body 4 has a metal base plate 9 connected to it by screws 10. This plate 9 is in turn connected to an inverted U-shaped bracket 11 which is pivotally connected to a shallow further U-shaped bracket 12. This pivotal connection is by means of a rod 13 extending through aligned suitable apertures in the legs of the two brackets. The bracket 12 is loosely bolted by bolts 14 to a plate 15. The bolts 14 extend through slots in the base of the bracket 12 which is pivotally connected to the base plate 15 on or near the centre line of the saw blade through pivot 78 thus allowing the position of the bracket to be finely adjusted with regard to the plate 15. The plate 15 is pivotally connected to a further plate 16, the two plates together forming the saw base (indicated generally by the reference numeral 17).

To provide the pivotal connection between the plates 15 and 16 upstanding apertured lugs 18 are provided on the plate 16 and outwardly extending apertured lugs 19 are provided on the plate 15. Pivots 20 extend through the aligned apertures. So that the plate 15 may be fixed in a chosen pivotal position relative to the plate 16 a backing slide device 100 is provided. A helical compression spring 21 is constrained to act between an L-shaped bracket 22 connected to the base of the bracket 11 and a locating cup 23 fixed to the bracket 12.

Figure 2:
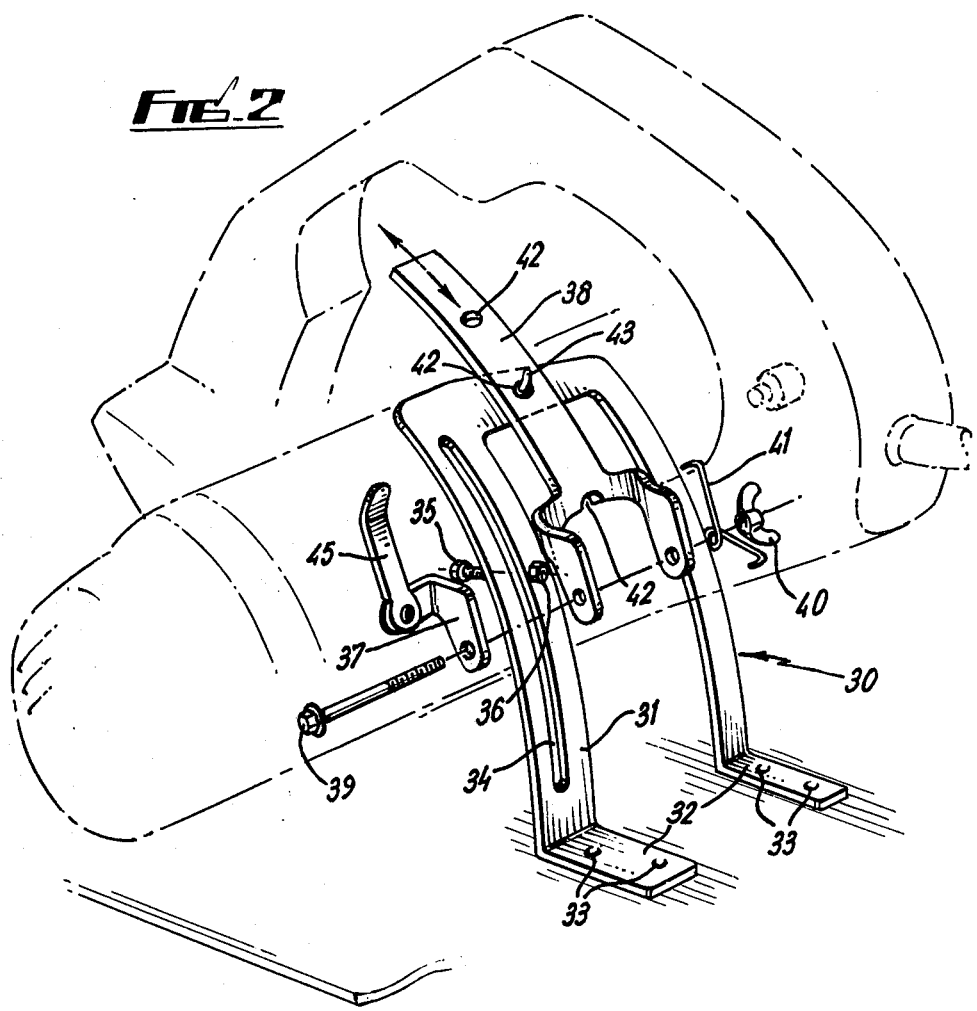
FIG. 2 shows a partial view of the saw of FIG. 1 showing a constructional detail.

Referring specifically to FIG. 2, apart from the pivotal connection just described the central body 4 of the saw is also connected to the plate 15 of the saw base 17 through a latching device indicated generally on FIG. 2 by the reference numeral 30. This device 30 comprises a curved U-shaped bracket 31 with two feet 32 at the free ends of the legs of the U fixed by screws or rivets 33 to the plate 15. One of the legs of the U is slotted at 34 and a bolt 35 extends through this slot and a threaded lever 45 and bracket 37 forming a pivot and is retained therein by a lock nut 36. The bracket 37 is apertured and a latch member 38 is pivotally connected to it by means of a bolt 39 and wing nut 40. The bolt 39 also extends through the handle 4 to connect it to the member 38. A spring 41 surrounds the bolt 39 and is constrained to urge the member 38 and bracket 31 together. The tongue of the member 38 has three apertures 42 and the bracket 31 has a complementary projection 43 so that the body 4 of the saw and therefore the saw blade 2 can be held latched in one of three positions relative to the saw base 17. The blade positions corresponding to the two uppermost apertures are first and second operative blade positions and the blade position corresponding to the third aperture is a safety position with the blade within the housing 3. Moving the lever 45 from the position shown in FIG. 3 to that shown in FIG. 2 locks the member 31 relative to the bracket 37. The safety housing 3 also acts as a sawdust collector, the dust being removed by vacuum through the outlet 47.

Figure 4A:
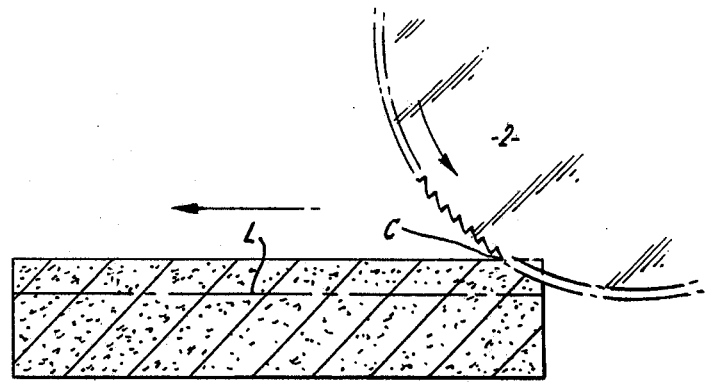
Figure 4B:
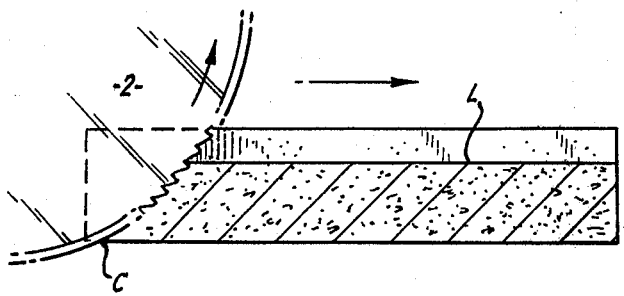

The operation of the saw will now be described with reference to FIGS. 4a and 4b of the drawing. A cut right through a piece of material is effected by means of a double traverse of the saw over the material. With the saw blade latched in its first operative position, that is the projection 43 extends through the middle apertures of the member 38, the material is traversed from right to left by the saw as shown in FIG. 4a. The saw blade 2 revolves anti-clockwise and the teeth of the saw blade therefore approach the surface of the material at the point of cutting C. The depth of the saw blade below the surface of the material is less than the thickness of the material and is preferably equal to about a third of this thickness. The first traverse therefore does not result in the material being cut right through, but only to a depth indicated say by the line L. At the end of the first traverse the latch member 38 is released to allow the saw blade to pivot downwards, the member being automatically relatched in the lower position where the projection 43 will extend through the upper aperture. Release is effected by pulling the member 38 with the index finger against the spring force provided by the spring 41. The workpiece is then traversed from left to right as shown in FIG. 4b. The direction of rotation of the saw blade remains the same so the teeth of the blade again approach the surface of the material at the point of cut C but this time from below. With this second traverse the material is cut right through. To ensure that both traverses take place along the same line, the straight edge provided by the guide edge 50 of the base is run along a fixed straight edge. If desired, the angle of cut can be adjusted by pivoting the upper plate 15 relative to the lower plate 16 of the base. The parallel relation of the saw blade 2 to the straight edge 50 can be adjusted by loosening the nuts 14 and adjusting the bracket 12.

Figure 3:
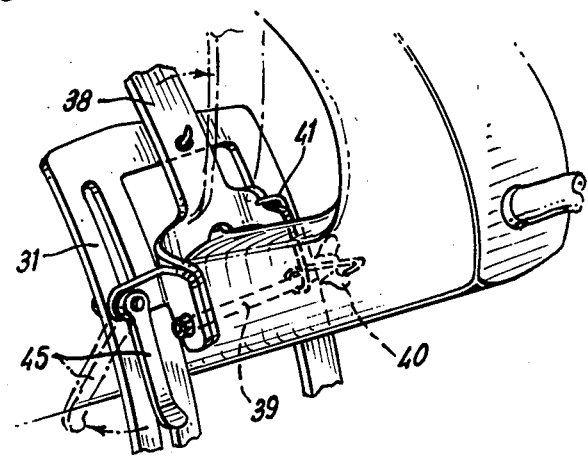
FIG. 3 shows a further partial view of the saw of FIG. 1 showing a further constructional detail, FIGS. 4a and 4b diagrammatically illustrate the operation of the saw.
Figure 6:
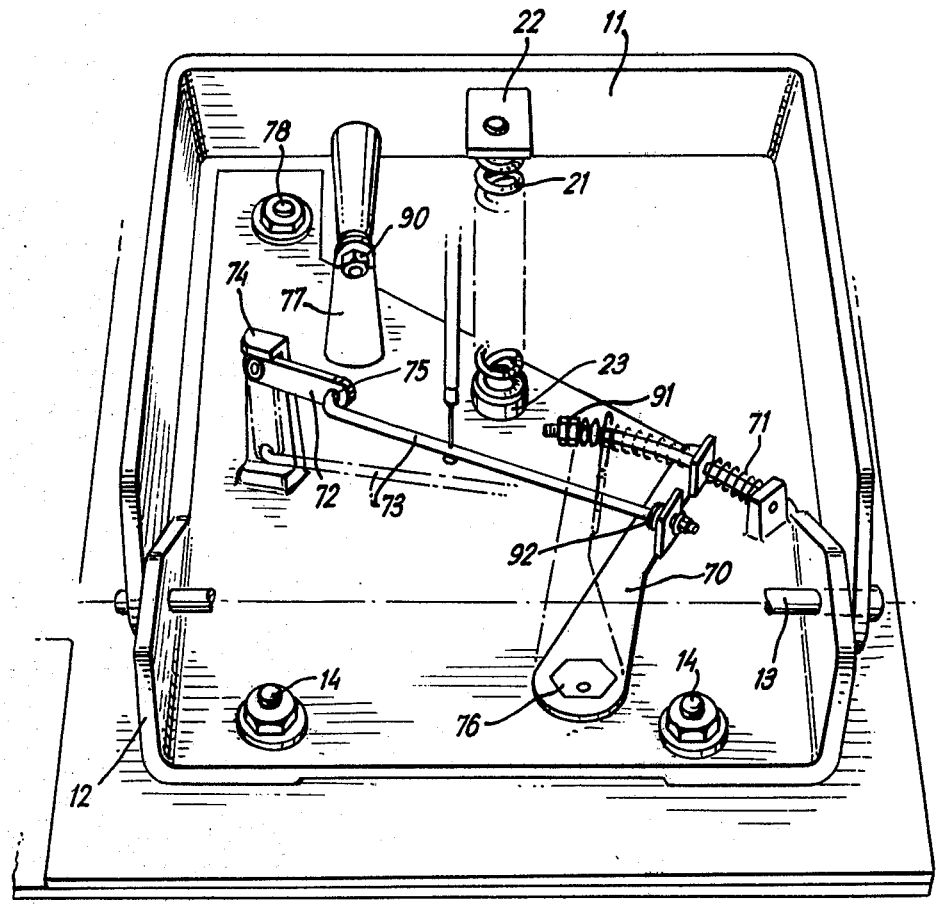
FIG. 6 shows a detail view of the mounting arrangement of the saw of FIG. 5.

The embodiment illustrated in FIGS. 5 and 6 of the drawings is basically the same as that illustrated in FIGS. 1 to 3, and equivalent parts in the two embodiments have been indicated by the same reference numerals. In the embodiment of FIGS. 5 and 6, however, the bolts 14 extend through slots in the base of the bracket 12 to allow the position of the bracket to be adjusted with regard to the plate 15 between two angular positions about a pivot 78 which lies on or near the centre line of the saw blade 2. As in the first described embodiment the plate 15 is pivotally connected to a further plate 16, the two plates together forming the saw base (indicated generally by the reference numeral 17). A mechanism is associated with the bracket 12 for automatically pivoting the bracket about the pivot 78 depending upon the position of the saw itself. This mechanism comprises an eccentric 76 disposed in an aperture cut into the bracket 12 which is pivoted positively to base plate 15 and connected to a lever 70. The lever 70 is connected via a long lever 73 and a short lever 72 to a pivoted stop member 74. The lever 72 and 73 are pivotally connected together at 75 and the other end of the lever 72 is achored at the stop member 74. A compression spring 71 is constrained to act between the free end of the lever 70 and one leg of the bracket 12. A striker 77 is adjustably fixed to the underside of the U-shaped bracket 11. The long lever 73 is joined via a bowden cable 80 to a lever 81 pivotally mounted on the body 4 of the saw. The operation of this mechanism will be described later.

Figure 7:
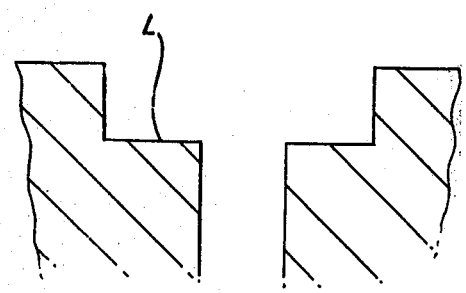
FIG. 7 shows an exaggerated cross-sectional view of the type of saw cut obtained with the saw of FIGS. 5 and 6.

The operation of this embodiment of the saw is similar to that of the saw of the first described embodiment and will now be described with reference to FIGS. 4a, 4b and 7 of the drawings. As with the saw of the embodiment of FIG. 1, a cut right through the material is effected by means of a double traverse of the saw over the material. The adjustment mechanism for the bracket 12 is adjusted manually to the position shown in full line in FIG. 6. In that full line position pivot 75 is above the line joining the ends of the levers 72 and 73 and is urged upwardly by spring 71. This manual adjustment is obtained by depressing the lever 81 to pull the bowden cable 80, and through it the lever 73 upwardly. The lever 70 is pivoted clockwise with the eccentric 76 thus angling the bracket 12 and the saw blade 2 indirectly supported on it slightly with respect to the straight edge of the plate 15. As the blade is advanced through the material on a first traverse a cut is produced which is slightly greater in width than the kerf width of the saw blade. A suitable angling will give, for example, a width of cut 0.010" wider than the width of the blade. The saw blade 2 revolves anti-clockwise and the teeth of the saw blade therefore approach the surface of the material at the point of cutting C. The depth of the saw blade below the surface of the material is made very small to avoid undue loading of the saw due to the slight angling of the blade to the direction of traverse. A depth of 1 mm would be considered sufficient. At the end of this first traverse, therefore, a cut 1 mm deep and slightly wider than the saw blade has been cut. The base of the cut is indicated at L in FIGS. 4a and 4b and 7. In setting up the saw for cutting, the position of the striker 77, the parallel portion of the saw blade and degree of offset of the saw blade when angled can be adjusted by means of respective adjusting nuts 90, 91 and 92.

At the end of the first traverse the latch member 38 is released to allow the saw blade to pivot downwards, the member being automatically relatched in the lower position where the projection 43 will extend through the upper aperture. Release is effected by pulling the member 38 with the index finger against the spring force provided by the spring 41. The lowering of the saw blade 2 automatically adjusts the mechanism for pivoting the bracket 12 about the pivot 78. On lowering of the saw blade 2, the striker 77 depresses the pivot 75 and once this pivot 75 has moved down past the position in which the levers 72 and 73 are aligned the lever snaps sharply to the left under the action of the spring 71. The positions then adopted by the levers 70, 72 and 73 are shown in dotted line in FIG. 6. In that position the saw blade 12 is aligned parallel with the straight edge of the plate 15. The workpiece is then traversed from left to right as shown in FIG. 4b. The direction of rotation of the saw blade remains the same so the teeth of the blade again approach the surface of the material at the point of cut C but this time from below. With this second traverse the material is cut right through, and when the operator lifts the saw from the workpiece the body of the saw separates automatically from base plate 15 with the help of compression spring 21 thus ensuring that blade 2 is fully and safely retracted into its housing.

To make this automatic separation possible stop 43 and locating apertures 42 are shaped in such a way that they slide out of embrace on the lifting movement and correspondingly on the downward movement they embrace positively in the fashion of the ratchet. The form of the composite slot produced is then as shown in FIG. 7. To ensure (as in the embodiment of FIG. 1) that both traverses take place along the same line (although the blade is angled in the first traverse) the straight edge provided by the edge 50 of the base is run along a fixed straight edge. If desired, the angle of cut can be adjusted by pivoting the upper plate 15 relative to the lower plate 16 of the base.

The above described portable saw embodiments may be simply used to prevent the sort of splintering of workpieces normally sustained at the point where the rotating saw blade emerges from the material of the workpiece. By providing in the saw the means whereby the saw blade always approaches the surface of the material at the point of cut, the surface of the material is pushed in rather than out during the cutting operation. In addition, in the embodiment of FIGS. 5 and 6, the blade in the major cutting second stroke emerges into a wider already cut groove and the danger of spelching is thereby reduced or eliminated. Some splintering of the material might result at the edges of the workpiece but this is relatively minor and can in any event usually be subsequently concealed. The saw has great applicability to the sawing of melamine faces or similar coated wood, ply-wood, chipboard or other types of board since with this type of faced material the emerging saw blade usually causes unsightly chipping of the facing material. A portable saw has been described because it is felt that the greatest advantages of the invention will be secured with this sort of saw. However, the invention is equally applicable to a fixed saw. With such a saw it would of course usually be necessary to move the workpiece relative to the saw blade rather than the other way round. The saw has therefor been designed to fit into a workbench in an orthodox manner. The workpiece is moved across the saw blade for a first, scribing cut and after pivoting the blade upwards through a base plate the workpiece is moved back again thus cutting it right through.

It will be appreciated that the above embodiments have been described by way of example only and that many variations are possible without departing from the scope of the invention. For example, in the embodiment of FIGS. 5 and 6, instead of a lever mechanism for rotating the bracket 12 with respect to the plate 15, the bracket 12 could be directly rotated. Alternatively, this rotation could be effected through a bowden cable controlled directly from the handle of the saw. In both cases, however, automatic return of the saw blade to the aligned position should be provided for to reduce the danger of the blade being drawn at an angle through too great a thickness of material. By providing more stop positions (e.g. ⅛" holes at 1" intervals) on the member 38 different sizes of saw blade (e.g. 5", 6" and 7") can be accommodated. In addition the projection 43 is adjustable so that wear on the blade caused by sharpening can be taken up. The member 38 could be made interchangeable for different operations. One such member could have a plurality of stop positions as close together as possible. Alternatively, a fine toothed ratchet could be used.

In another variation, a simple alternative to the bowden cable operated eccentric 76 is a manually operated lever directly connected to the eccentric and positioned in such a way that the saw cannot be lowered whilst the lever is in the scribing position. Also, instead of having the latch centrally of the handle it could be positioned otherwise for example to one side of the handle. Further by making the position of the stop of the latch adjustable and increasing the number of apertures a virtual continuous adjustment can be provided for.

What is claimed is:

1. A saw comprising:
a rotatable saw blade,
a base having a guide edge,
means for pivotally mounting the saw blade on the base about an axis perpendicular to the plane of the base, said perpendicular axis being close to the axis of rotation of the blade, and
means for shifting the saw blade about said perpendicular axis between a position in which the plane of the saw blade is parallel to the guide edge of the base and a position in which the plane of the saw blade is slightly angled with respect to the guide edge of the base.

2. A saw as claimed in claim 1 including:
means for pivotally mounting the saw blade on the base about an axis parallel to the axis of rotation of the saw blade, so that the depth to which the blade projects beneath the base can be varied, and
means responsive to movement of the blade to a predetermined position beneath the base for operating said shifting means to move the blade between its parallel and angled positions with respect to the base guide edge.

3. A saw as claimed in claim 2 including latch means for maintaining the saw blade in at least two different positions of adjustment about said parallel axis, the blade projecting beneath the base to two different depths in the two positions of adjustment, and one of said positions of adjustment being said predetermined position.

4. A saw as claimed in claim 3 wherein said responsive means includes a spring-biased toggle mechanism having two stable positions, and means movable with the saw blade about said parallel axis for urging the toggle mechanism from one of its stable positions toward the other, so as to operate said shifting means.

5. A saw as claimed in claim 4 including manually-operated means for moving the toggle mechanism back to said one of its stable positions.

6. A saw as claimed in claim 3, in which the latch means comprises a bracket fixed to the base and a latch member slidable with respect to the bracket.

7. A saw as claimed in claim 6, in which the latch member defines a plurality of apertures and the bracket comprises a locating complementary stop which can extend through one of the apertures in order to latch the bracket and member together in one of a plurality of relative positions.

8. A saw as claimed in claim 7, in which spring means are provided to urge the bracket and latch member together.

9. A saw claimed in claim 8 in which the saw comprises a handle which may be grasped by an operator to pivot the saw blade relative to the base, the latch member being pivotally mounted on the handle.

10. A saw as claimed in claim 6, in which the bracket defines an elongate slide enabling the saw blade to be locked in any required pivotal position relative to the base in the plane of the saw blade.

11. A saw as claimed in claim 9, in which the handle is connected to a U-shaped bracket which is pivotally connected to a bracket on the base to provide the pivotal mounting of the saw blade with respect to the base.

12. A saw as claimed in claim 11, in which the bracket on the base is adjustable with respect to the base.

13. A saw as claimed in claim 12, in which the base is itself pivotal with respect to a further base member about an axis at right angles to the axis of rotation of the saw blade.

* * * * *